United States Patent
Brozicek

(10) Patent No.: US 12,251,989 B2
(45) Date of Patent: Mar. 18, 2025

(54) COOLING SYSTEM FOR A MOTOR VEHICLE

(71) Applicant: Dr. Ing. h.c. F. Porsche Aktiengesellschaft, Stuttgart (DE)

(72) Inventor: Christian Brozicek, Heilbronn (DE)

(73) Assignee: Dr. Ing. h.c. F. Porsche Aktiengesellschaft (DE)

( * ) Notice: Subject to any disclaimer, the term of this patent is extended or adjusted under 35 U.S.C. 154(b) by 235 days.

(21) Appl. No.: 17/943,302

(22) Filed: Sep. 13, 2022

(65) Prior Publication Data
US 2023/0109644 A1 Apr. 6, 2023

(30) Foreign Application Priority Data
Oct. 5, 2021 (DE) .................. 10 2021 125 741.7

(51) Int. Cl.
*B60H 1/32* (2006.01)
*B60H 1/00* (2006.01)

(52) U.S. Cl.
CPC ..... *B60H 1/32284* (2019.05); *B60H 1/00885* (2013.01); *B60H 1/3205* (2013.01); *B60H 2001/00928* (2013.01)

(58) Field of Classification Search
CPC . B60H 1/3228; B60H 1/00885; B60H 1/3205
See application file for complete search history.

(56) References Cited

U.S. PATENT DOCUMENTS

| 9,780,422 B2 | 10/2017 | Dunn et al. |
| 10,403,946 B2 | 9/2019 | Jalilevand et al. |
| 11,358,434 B2 | 6/2022 | Porras et al. |
| 11,390,138 B2 | 7/2022 | Herbolzheimer et al. |
| 2008/0307811 A1* | 12/2008 | Bryan .................. F25B 49/025 62/228.3 |
| 2012/0247716 A1* | 10/2012 | Galtz ..................... B60L 50/16 165/41 |

(Continued)

FOREIGN PATENT DOCUMENTS

| CN | 110949088 B | * 12/2020 |
| DE | 102015206603 A1 | 10/2015 |

(Continued)

OTHER PUBLICATIONS

Translation of CN110949088B named Translation-CN110949088B (Year: 2020).*

*Primary Examiner* — Paul Alvare
(74) *Attorney, Agent, or Firm* — Buchanan Ingersoll & Rooney PC

(57) ABSTRACT

A cooling system of a motor vehicle includes a first cooling circuit and a second cooling circuit. A refrigerant circuit supplies a vaporizer associated with the first cooling circuit that has a first target power value (S1) determining a cooling potential. The refrigerant circuit also supplies a refrigerant-coolant heat exchanger associated with the second cooling circuit that has a second target power value (S2) determining a cooling potential. A conveyor unit controls a mass flow of a refrigerant flowing through the refrigerant circuit and can be controlled by the first target power value (S1). The cooling system includes a control unit by way of which the first target power value (S1) can be controlled to achieve the second target power value (S2).

14 Claims, 2 Drawing Sheets

(56) References Cited

U.S. PATENT DOCUMENTS

| | | | |
|---|---|---|---|
| 2015/0291002 A1 | 10/2015 | Smith | |
| 2016/0339760 A1* | 11/2016 | Dunn | H01M 10/625 |
| 2017/0240024 A1* | 8/2017 | Blatchley | B60H 1/3213 |
| 2017/0313158 A1* | 11/2017 | Porras | H01M 10/63 |
| 2018/0215231 A1* | 8/2018 | Porras | B60H 1/323 |
| 2020/0317026 A1* | 10/2020 | Kitamura | B60H 1/00899 |

FOREIGN PATENT DOCUMENTS

| | | |
|---|---|---|
| DE | 102016108570 A1 | 11/2016 |
| DE | 102017113102 A1 | 12/2017 |
| DE | 102018101619 A1 | 8/2018 |
| DE | 102019107192 A1 | 9/2020 |
| EP | 2903854 A2 | 8/2015 |

* cited by examiner

COOLING SYSTEM FOR A MOTOR VEHICLE

CROSS-REFERENCE TO RELATED APPLICATION

This application claims priority to German Patent Application No. 10 2021 125 741.7, filed Oct. 5, 2021, the content of such application being incorporated by reference herein in its entirety.

FIELD OF THE INVENTION

The invention relates to a cooling system of a motor vehicle.

BACKGROUND OF THE INVENTION

Cooling systems of motor vehicles provided for cooling electric drive components of the motor vehicle are known. In the cooling system, a suitable refrigerant is used as the fluid, wherein a condensation energy as well as vaporization energy, which the refrigerant releases or absorbs under given high pressure or low pressure, can be generated by a circular process. In a motor vehicle with an electric drive, two cooling circuits of the cooling system are usually supplied from a refrigerant circuit.

A cooling power is provided for conditioning a passenger compartment, and a cooling power is provided for cooling the electric drive, e.g., a high-volt component. The two cooling circuits may simultaneously and independently request a required cooling power during driving operation so that the refrigerant circuit must meet two different power requirements.

DE 10 2017 113 102 A1, which is incorporated by reference herein, discloses a cooling system of a motor vehicle with a refrigerant circuit for cooling a vehicle interior, wherein a cooling circuit for cooling a battery is additionally provided, which cooling circuit is thermally coupled to the refrigerant circuit via a heat exchanger, wherein in emergency situations, battery cooling is prioritized over interior cooling.

DE 10 2019 107 192 B4, which is incorporated by reference herein, discloses a cooling system of a motor vehicle with a refrigerant circuit for cooling a vehicle interior and a battery, wherein separate cooling circuits are provided for cooling the vehicle interior and the battery, which cooling circuits can be connected via valves, wherein the cooling circuit for cooling the battery is prioritized if a maximum temperature of the battery is exceeded.

DE 10 2016 108 570 A1, which is incorporated by reference herein, discloses a cooling system for cooling a battery of a motor vehicle, wherein the cooling system comprises a refrigerant circuit and a cooling circuit, wherein a vaporizer is controlled by means of a PI controller.

DE 10 2018 101 619 A1, which is incorporated by reference herein, discloses a cooling system of a motor vehicle with a refrigerant circuit for cooling a vehicle interior, wherein a cooling circuit for cooling a battery is additionally provided, which cooling circuit is thermally coupled to the refrigerant circuit via a heat exchanger, wherein a compressor is controlled by means of a PI controller, and wherein the cooling circuit for cooling the battery is prioritized if a maximum temperature of the battery is exceeded.

DE 10 2015 206 603 A1, which is incorporated by reference herein, and EP 2 903 854 B1, which is incorporated by reference herein, teach a cooling system of a motor vehicle with a plurality of cooling circuits for cooling a vehicle interior and a battery, wherein the coolant flow through the section for cooling the battery is increased upon increased demand for battery cooling, and vehicle interior cooling is thereby reduced.

SUMMARY OF THE INVENTION

Described herein is a cooling system of a motor vehicle that can reliably cover a cooling demand of different cooling circuits of the cooling system at the same time. Also described is a method for a cooling system of a motor vehicle that implements an equally prioritized operation of a first cooling circuit and a second cooling circuit of the cooling system.

A cooling system according to aspects of the invention of a motor vehicle, which comprises a first cooling circuit and a second cooling circuit and has a refrigerant circuit, which is designed to supply a vaporizer associated with the first cooling circuit and having a first target power value determining a cooling potential, and to supply a refrigerant-coolant heat exchanger associated with the second cooling circuit and having a second target power value determining a cooling potential, wherein a conveyor unit is designed to control a mass flow of a refrigerant flowing through the refrigerant circuit and can be controlled by means of the first target power value, is wherein the cooling system has a control unit (e.g., computer, processor, controller and/or memory), by means of which the first target power value can be controlled to achieve the second target power value. The advantage of the cooling system according to aspects of the invention is the implementation of an operation of the cooling system with the first cooling circuit at the first target power value thereof and with the second cooling circuit at the second target power value thereof. With the cooling system according to the invention, it can be ensured that neither of the two cooling circuits must be prioritized so that one of the two cooling circuits can be operated at its requested target power value. This means that any cooling demand of the cooling circuits of the cooling system can be reliably covered at the same time.

If the first target power value can be set by means of a power deficit of the refrigerant-coolant heat exchanger, wherein the power deficit is a difference between the second target power value and an actual power value of the refrigerant-coolant heat exchanger, a process-oriented and thus economical cooling system is ensured since exclusively the first target power value, which causes the cooling system to operate at, and not potentially beyond, the first target power value and the second target power value, is corrected only to a certain extent.

The needs-based power control customary according to the prior art, which is primarily controlled via a conveyor unit associated with the refrigerant circuit, can only control one power target, i.e., can control only the first cooling circuit or the second cooling circuit. That is to say, only one target power value of one of the two cooling circuits is technically controlled in terms of power and a systemic power point set in this way thus defines an existing cooling potential of the other cooling circuit.

Due to a physical behavior of air, e.g., the risk of icing in the case of excessive cooling, a so-called air-flow cooling circuit, which corresponds to the first cooling circuit, is primarily controlled in a dual operation of the two cooling circuits and thus defines a power level of the so-called water-flow cooling circuit, which corresponds to the second cooling circuit.

However, the underlying target power values are completely independent of one another, which can result in so-called thermal inclined loads so that negative influence can occur in this case, provided the power level of at least one of the two cooling circuits is not sufficient. This means that if only a low cooling power is generated due to a requirement for the target power value of the first cooling circuit, a low cooling potential of the second cooling circuit is brought about. However, if a high cooling power of the second cooling circuit is currently required, it cannot be reached and this can result in damage to the components to be cooled associated with the second cooling circuit. If, for example, due to these thermal inclined loads, there is insufficient cooling power for high-volt components, a so-called performance loss can also be used to switch off the high-volt components and an entire high-volt system. In the case of an electrified motor vehicle, increased consumption thus arises since the performance loss must be compensated by means of the internal combustion engine. In a purely electric motor vehicle, this results in a standstill, in other words in a so-called broken-down vehicle.

This is avoided with the cooling system according to aspects of the invention since both cooling circuits can be controlled in such a way that both cooling circuits have a requested cooling potential due to the control unit according to the invention, wherein the requested cooling potentials are equivalent to the corresponding target power value.

The overall advantage of the cooling system according to aspects of the invention is to be seen in that by means of the control unit, which preferably comprises a control element in the form of a PI controller, the target air temperature at the vaporizer is controlled or in other words corrected in such a way that the second cooling circuit can likewise be controlled according to power. The correction takes place as a function of a power deficit of the refrigerant-coolant heat exchanger, a so-called chiller, as a result of which the correction is at minimum consumption until a target power value of the refrigerant-coolant heat exchanger is met.

A sufficient cooling power for high-volt components of the motor vehicle is thus ensured even with thermal inclined loads, and the robustness of the thermal management system is thus increased. Constant control of a power demand of the chiller can result in an extension of a service life of the high-volt components, in particular the high-volt battery. This furthermore results in an improved electrical continuous power of the high-volt components in the second cooling circuit.

The second aspect of the invention relates to a method for a cooling system of a motor vehicle, wherein the cooling system comprises a first cooling circuit and a second cooling circuit and has a refrigerant circuit, which is designed to supply a vaporizer associated with the first cooling circuit and having a first target power value determining a cooling potential and to supply a refrigerant-coolant heat exchanger associated with the second cooling circuit and having a second target power value determining a cooling potential.

For controlling a mass flow of a refrigerant flowing through the refrigerant circuit, the cooling system comprises a conveyor unit, which is controlled by means of the first target power value. According to aspects of the invention, the first target power value, the second target power value and an actual power value of the second cooling circuit are determined in a first step, and a power deficit is determined in a second step as the difference between the actual power value and the second target power value, and the first target power value is controlled in a third step until the second target power value is achieved, wherein the power deficit is used to control the first target power value. A dual operation of the two cooling circuits can thus be implemented in a simple manner, wherein an equally prioritized operation of the two cooling circuits is achieved while reaching their target power values.

BRIEF DESCRIPTION OF THE DRAWINGS

Additional advantages, features and details of the invention arise from the following description of preferred exemplary embodiments and with reference to the drawing. The features and combinations of features mentioned above in the description and the features and combinations of features mentioned below in the description of the figures and/or shown only in the figure can be used not only in the respectively indicated combination but also in other combinations or on their own without departing from the scope of the invention. Shown are.

DETAILED DESCRIPTION OF THE INVENTION

Figure 1:
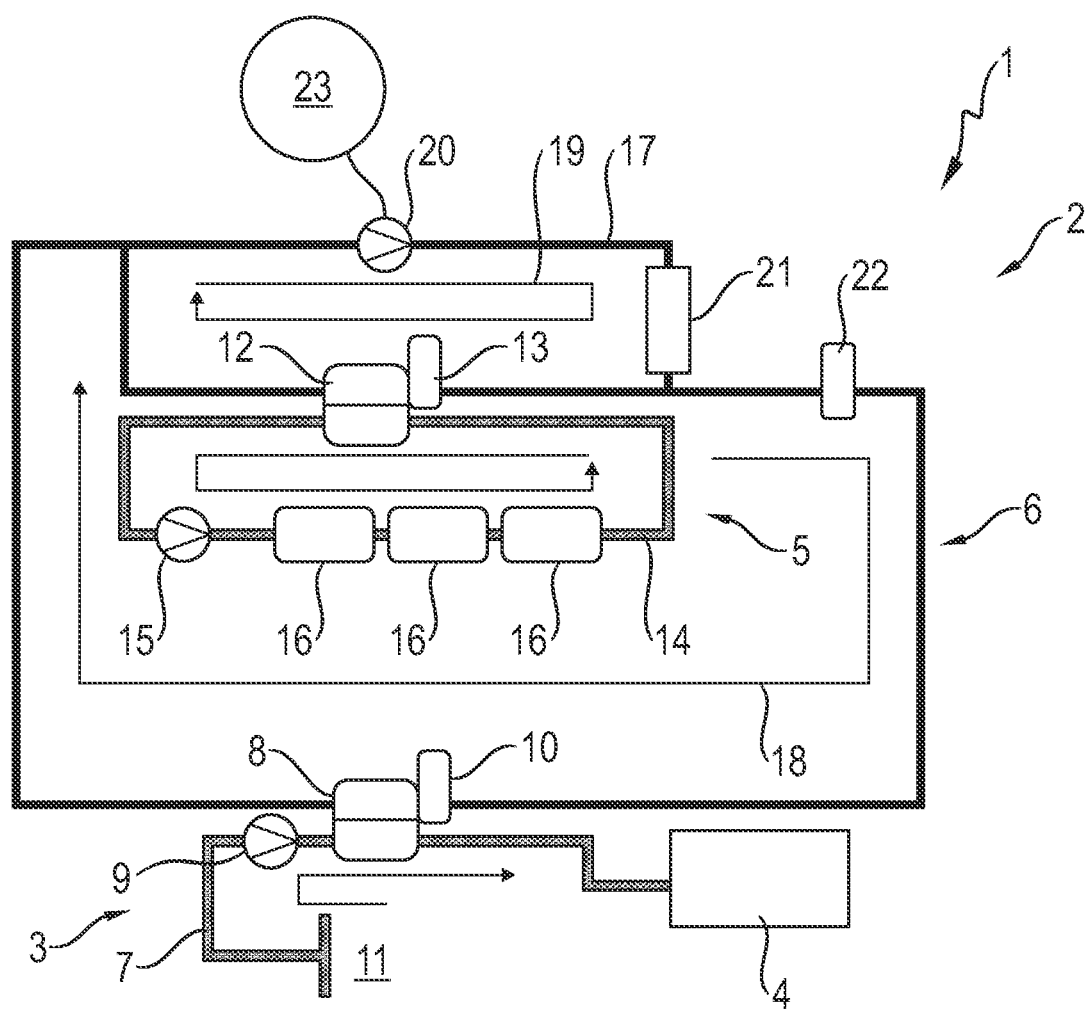
FIG. 1 is a schematic diagram of a cooling system according to aspects of the invention of a motor vehicle, comprising a first cooling circuit and a second cooling circuit.

A cooling system 1 according to aspects of the invention of a motor vehicle 2, whose drive assembly not shown in more detail is embodied in the form of an internal combustion engine and an electric motor, thus a drive assembly commonly referred to as a hybrid drive, or in the form of an electric motor or in the form of an assembly generating at least electrical power, is designed according to FIG. 1.

The cooling system 1 according to aspects of the invention comprises a first cooling circuit 3, which is provided for the climate control of an interior 4 of the motor vehicle 2, and a second cooling circuit 5, which is designed for cooling the drive assembly 16 and/or its components 16, which heat during operation, as well as a refrigerant circuit 6, which is designed for supplying refrigerant to both cooling circuits 4, 5.

The first cooling circuit 3 comprising a first circuit line 7 of the cooling system 1 is thermally coupled to the refrigerant circuit 6 by means of a vaporizer 8 which is accommodated in the first circuit line 7 such that fluid can flow through it. Via a first conveyor assembly 9 of the cooling system 1, which is designed in the form of a blower and which is also accommodated in the first circuit 7 such that fluid can flow through it, fresh air is supplied to the first cooling circuit 3 preferably from an environment 11, wherein the vaporizer 8, which comprises an expansion valve 10 designed for controlling, is arranged in the first cooling circuit 3 between the first conveyor assembly 9 and the interior 4.

A refrigerant-coolant heat exchanger 12, a so-called chiller, serves to thermally couple the second cooling circuit 5 to the refrigerant circuit 6. The refrigerant-coolant heat exchanger 12, which comprises a further expansion valve 13 for controlling, is accommodated in a second circuit line 14 of the cooling system 1 such that fluid can flow through it, said second circuit line being associated with the second cooling circuit 5. In order to convey coolant in the second cooling circuit 5, said circuit comprises a second conveyor assembly 15 of the cooling circuit 1 in the form of a pump, which is arranged upstream of the cooling components 16 and downstream of the refrigerant-coolant heat exchanger 12 in the direction of a flow through the second cooling circuit 5 indicated by means of the arrow. At this point, it should be mentioned that a flow through the first cooling circuit 3 is likewise indicated by means of an arrow, wherein this flow takes place from the environment 11 in the direction of the interior 4.

The refrigerant circuit 6 comprises a refrigerant circuit line 17 of the cooling system 1 via which the refrigerant can be supplied to the vaporizer 8 and the refrigerant-coolant heat exchanger 12. The refrigerant circuit 6 is divided into a first refrigerant sub-circuit 18 and a second refrigerant sub-circuit 19, wherein the first refrigerant sub-circuit 18 is associated with the first cooling circuit 3 and the second refrigerant sub-circuit 19 is associated with the second cooling circuit 5. In other words, the first refrigerant sub-circuit 18 is designed to supply refrigerant to the vaporizer 8 and the second refrigerant sub-circuit 19 is designed to supply refrigerant to the refrigerant-coolant heat exchanger 12. Or, in yet other words, the first refrigerant sub-circuit 18 is designed to supply an air-flow cooling and the second refrigerant sub-circuit 19 is designed to supply a water-flow cooling.

The refrigerant circuit 6 furthermore comprises a conveyor unit 20 in the form of a compressor, which is accommodated in the refrigerant circuit line 17 such that fluid can flow through it, as well as a condenser 21. Furthermore, a valve element 22 in the form of a shut-off valve is arranged in the refrigerant circuit line 17, by means of which valve element a flow through the refrigerant circuit 6 can be controlled. The conveyor unit 20 serves to control a mass flow of the refrigerant and is thus designed as a control unit of the cooling system 1, which control unit, in accordance with the prior art, controls a power of the vaporizer 8, wherein a power of the refrigerant-coolant heat exchanger 12 results, i.e., is not directly controlled.

The cooling system 1 according to aspects of the invention comprises a control unit 23, which serves to set the operation of the conveyor unit 20. The control unit 23 has a control element in the form of a PI controller. Likewise, the control unit 23 could also be designed with another control element that is suitable for the control explained in more detail below.

By means of the control unit 23, a first target power value S1 of the first cooling circuit 3 can be controlled in order to achieve a second target power value S2 of the second cooling circuit 5. In other words, the control unit 23 controls the first target power value S1 to the effect that, starting from an actual power value LI of the second cooling circuit 5, which is below the desired second target power value S2, i.e., is insufficient for cooling the cooling components 16, the second target power value S2 is set or, in other words, the second target power value S2 is set at the end of the controlling.

At this point, it should be mentioned that the target power values S1, S2 and the actual power value LI are to be understood as the power values of the refrigeration machines arranged in the cooling circuits 3, 5, of the vaporizer 8 and of the refrigerant-coolant heat exchanger 12, which power values cause an associated cooling power potential of the cooling circuits 3, 5, which is why the target power values S1, S2 and the actual power value LI are associated with the cooling circuits 3, 5.

The first target power value S1 can be set by means of a power deficit LD of the refrigerant-coolant heat exchanger 12, wherein the power deficit LD is a difference between the second target power value S2 and an actual power value LI of the refrigerant-coolant heat exchanger 12. In other words, a current cooling potential of the refrigerant-coolant heat exchanger 12, which is associated with the actual power value LI, is not sufficient and a need for a higher cooling potential of the second cooling circuit 5 exists. The desired cooling potential of the second cooling circuit 5 can be reached with a second target power value S2 that is to be set, in other words, that is to be adjusted by means of the control unit 23. For this purpose, by means of the determined power deficit LD, a total cooling potential of the refrigerant circuit 6 is changed by changing the cooling potential of the first cooling circuit 3. The actual power value LI can be increased by means of the control unit 23.

Figure 2:
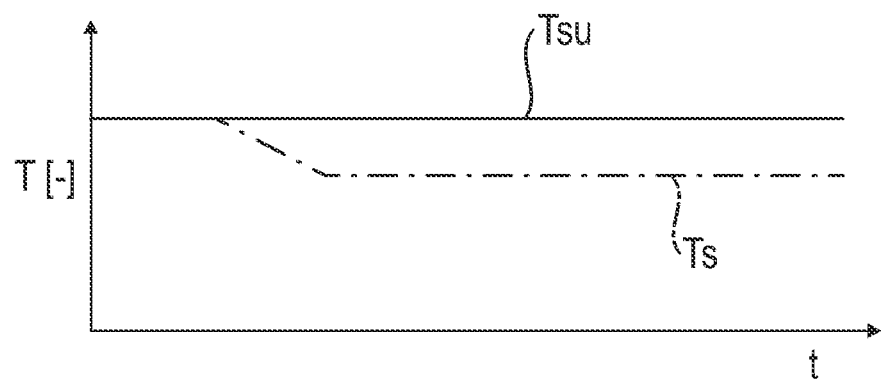
FIG. 2 is a time-temperature diagram of a target temperature value of the first cooling circuit of the cooling system according to FIG. 1.

A method according to aspects of the invention for operating the cooling system 1 is explained below with reference to FIGS. 2 and 3. In FIG. 2, a target temperature $T_S$ to be adjusted in the first cooling circuit 3 is marked in a temperature T-time t diagram by means of a dash-dotted line and is used to bring about the first target power value S1 and the second target line value S2. Furthermore, a curve of an initial target temperature $T_{Su}$ is marked by means of a solid line and corresponds to a target temperature of the vaporizer 8 of the first cooling circuit 3 before a correction by means of the power deficit LD. The target temperature $T_S$ has a lower value than the initial target temperature $T_{Su}$, as a result of which the total cooling potential of the refrigerant circuit 6 can be increased, e.g., is increased by increasing a rotational speed of the conveyor unit 20.

Figure 3:
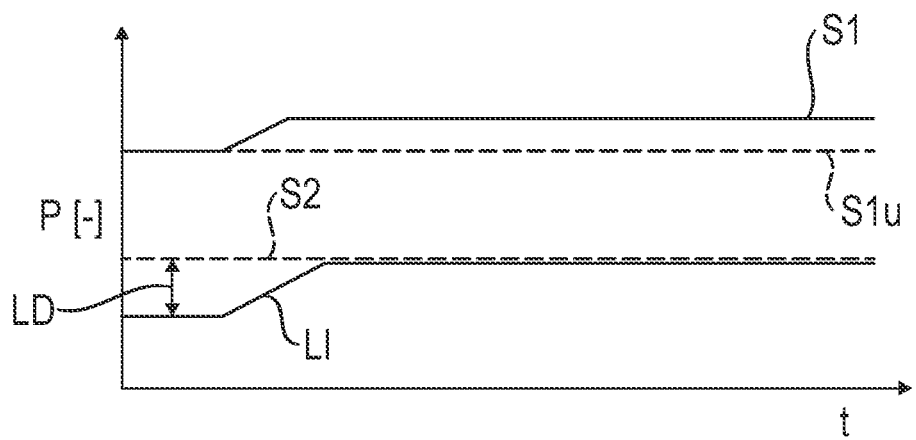
FIG. 3 is a time-power diagram of target and actual powers of the first cooling circuit and the second cooling circuit.

In FIG. 3, the target power values S1, S2 and the actual power value LI are marked as well as an initial target power value S1$u$ of the first cooling circuit 3. It can be seen that due to the control of the first target power value S1 as a function of the power deficit LD, the second target power value S2 can be reached and the first target power value S1 can be increased.

The method according to aspects of the invention is wherein in a first step, the first target power value S1, the second target power value S2 and the actual power value LI of the second cooling circuit 5 are determined, and in a second step, the power deficit LD is determined as the difference between the actual power value LI and the second target power value S2. In a third step, the first target power value S1 is controlled until the second target power value S2 is achieved, wherein the power deficit LD is used to control the first target power value S1. In other words, a rotational speed of the conveyor unit 20 is, for example, increased in the refrigerant circuit 6 for indirectly or directly supplying refrigerant to the two cooling circuits 3, 5 until the second target power value S2 is reached. Increasing the rotational speed of the conveyor unit 20 results in a reduction of a temperature of the refrigerant flowing in the refrigerant circuit 6, whereby the cooling potential of the vaporizer 8 is increased.

The cooling circuit 1 according to aspects of the invention comprises the valve element 22, which is generally fully open during the operation of the cooling circuit 1. If the cooling circuit 1 according to aspects of the invention is operated outside the method according to the invention, the cooling potentials of the cooling circuits 3, 5 can be set by means of this valve element 22.

LIST OF REFERENCE SIGNS

1 Cooling system
2 Motor vehicle
3 First cooling circuit
4 Interior
5 Second cooling circuit
6 Refrigerant circuit
7 First circuit line
8 Vaporizer
9 First conveyor assembly
10 Expansion valve
11 Environment
12 Refrigerant-coolant heat exchanger
13 Further expansion valve
14 Second circuit line
15 Second conveyor assembly
16 Cooling component
17 Refrigerant circuit line
18 First refrigerant sub-circuit
19 Second refrigerant sub-circuit
20 Conveyor unit
21 Condenser
22 Valve element
23 Control unit
LD Power deficit
LI Actual power value
P Power
S1 First target power value
$S1_u$ Initial power target value
S2 Second target power value
T Temperature
$T_S$ Target temperature value
$T_{Su}$ Initial target temperature value
t Time

What is claimed is:

1. A cooling system of a motor vehicle, said cooling system comprising:
a first cooling circuit,
a second cooling circuit,
a refrigerant circuit that is configured to supply (i) a vaporizer associated with the first cooling circuit, the vaporizer having a first target cooling potential value (S1) that is indicative of a cooling potential of the vaporizer, and (ii) a refrigerant-coolant heat exchanger associated with the second cooling circuit, the refrigerant-coolant heat exchanger having a second target cooling potential value (S2) that is indicative of a cooling potential of the refrigerant-coolant heat exchanger,
a conveyor unit that is configured to deliver a mass flow of a refrigerant through the refrigerant circuit, and
a control unit that is configured to control the conveyor unit in order to attain the first target cooling potential value (S1) of the vaporizer,
wherein, when the control unit calculates that the second target cooling potential value (S2) cannot be achieved due to the conveyor unit being initially set to achieve the first target cooling potential value (S1), the control unit adjusts the conveyor unit until the second target cooling potential value (S2) of the refrigerant-coolant heat exchanger is achieved,
wherein the first and second target cooling potential values are based, at least in part, on the mass flow of the refrigerant through the vaporizer and the refrigerant-coolant heat exchanger, respectively.

2. The cooling system according to claim 1, wherein the control unit adjusts the conveyor unit to compensate for a cooling potential deficit (LD) of the refrigerant-coolant heat exchanger, wherein the cooling potential deficit (LD) is a difference between the second target cooling potential value (S2) and an actual cooling potential value (LI) of the refrigerant-coolant heat exchanger.

3. The cooling system according to claim 2, wherein the control unit is configured to increase the actual cooling potential value (LI).

4. The cooling system according to claim 1, wherein the control unit comprises a PI controller.

5. The cooling system according to claim 1, further comprising a valve element arranged in the refrigerant circuit.

6. A motor vehicle comprising the cooling system of claim 1.

7. The motor vehicle according to claim 6, wherein the motor vehicle is a hybrid vehicle having an internal combustion engine and an electric motor that is configured to be operated as an alternative to the internal combustion engine.

8. The motor vehicle according to claim 7, wherein the control unit adjusts the conveyor unit until the second cooling potential value (S2) of the refrigerant-coolant heat exchanger is achieved so as to continue use of the electric motor without activating the internal combustion engine.

9. A method for a cooling system of a motor vehicle, wherein the cooling system includes (a) a first cooling circuit, (b) a second cooling circuit, (c) a refrigerant circuit that is configured to supply (i) a vaporizer associated with the first cooling circuit, the vaporizer having a first target cooling potential value (S1) that is indicative of a cooling potential of the vaporizer, and (ii) a refrigerant-coolant heat exchanger associated with the second cooling circuit, the refrigerant-coolant heat exchanger having a second target cooling potential value (S2) that is also indicative of a cooling potential of the refrigerant-coolant heat exchanger, and (d) a conveyor unit that is configured to deliver a mass flow of a refrigerant through the refrigerant circuit, wherein the first and second target cooling potential values are based, at least in part, on the mass flow of the refrigerant through the vaporizer and the refrigerant-coolant heat exchanger, respectively, the method comprising the steps of:
determining the first target cooling potential value (S1), the second target cooling potential value (S2) and an actual cooling potential value (LI) of the second cooling circuit,
controlling the conveyor unit in order to achieve the first target cooling potential value (S1) of the vaporizer,
identifying a cooling potential deficit (LD) as a difference between the actual cooling potential value (LI) and the second target cooling potential value (S2), and
adjusting the conveyor unit until the second target cooling potential value (S2) of the refrigerant-coolant heat exchanger is achieved and the cooling potential deficit (LD) is overcome.

10. The method according to claim 9, wherein adjusting the conveyor unit also increases a cooling potential of the vaporizer.

11. The method according to claim 9, wherein a control unit associated with the cooling system comprises a control element that is configured for adjusting the conveyor unit.

12. The method according to claim 11, wherein the control element is a PI controller.

13. The method according to claim 9, wherein the motor vehicle is a hybrid vehicle having an internal combustion engine and an electric motor that is configured to be operated as an alternative to the internal combustion engine.

14. The method according to claim 13, wherein the adjusting step is performed to continue use of the electric motor without activating the internal combustion engine.

\* \* \* \* \*